United States Patent [19]

Zhuk et al.

[11] 4,032,480
[45] June 28, 1977

[54] METHOD OF PRODUCING LINEAR POLYETHYLENIMINE

[76] Inventors: David Solomonovich Zhuk, ulitsa Vavilova, 44, korpus 4, kv. 172; Petr Alexandrovich Gembitsky, Leningradsky prospekt, 104, korpus 3, kv. 299; Anatoly Ivanovich Chmarin, Voikovskaya ulitsa, 3, kv. 54, all of Moscow, U.S.S.R.

[22] Filed: July 11, 1975

[21] Appl. No.: 595,215

[52] U.S. Cl. .......................... 260/2 EN; 260/239 E
[51] Int. Cl.$^2$ ................. C08F 22/02; C08G 73/06
[58] Field of Search ...................... 260/2 EN, 239 E

[56] References Cited

UNITED STATES PATENTS

| | | | |
|---|---|---|---|
| 2,182,306 | 12/1939 | Ulrich | 260/2 |
| 2,553,696 | 5/1951 | Wilson | 260/239 E |
| 2,806,839 | 9/1957 | Crowther | 260/77.5 |
| 3,052,669 | 9/1962 | Gavlin | 260/2 EN |
| 3,200,088 | 8/1965 | Tousignant | 260/2 EN |
| 3,203,910 | 8/1965 | Wilson | 260/2 EN |
| 3,228,957 | 6/1966 | Fremery | 260/313 |
| 3,492,289 | 1/1970 | Symm | 260/239 |
| 3,519,687 | 7/1970 | Schneider | 260/570.4 |
| 3,821,125 | 6/1974 | Saegusa | 260/2 EN |
| 3,842,019 | 10/1974 | Kropp | 260/2 EP |

FOREIGN PATENTS OR APPLICATIONS

| | | | |
|---|---|---|---|
| 466,344 | 5/1937 | United Kingdom | 260/2 EN |
| 488,553 | 7/1938 | United Kingdom | 260/2 EN |

*Primary Examiner*—Paul Lieberman

[57] ABSTRACT

A method of producing linear polyethylenimine involving mass polymerization of ethylenimine or its oligomers: dimer, trimer or linear tetramer taken individually or in a mixture at a temperature within the range of from 40° to 55° C in the presence of cationic catalysts such as mineral acids, ammonium salts of mineral acids: hydrochloric acid, sulphuric acid or chloric acid, ammonium salts of hydrochloric or chloric acid, dichloropropane or dichloropropanol taken in an amount ranging from 0.1 to 1.0 mol.% per each elementary unit. Said polymerization in mass is performed till a conversion ratio of ethylenimine cycles of 10 to 25% is reached. Thereafter, the resulting polymerization mixture is cooled to a temperature within the range of from 5° to 25° C, added with water at a weight ratio between water and the polymerization mixture ranging from 1:2.5 to 2.5:1 and the mixture is maintained at a temperature within the range of from 5° to 25° C until completion of the polymerization process to obtain a heterogeneous polymerization mixture containing linear polyethylenimine crystallohydrate as a precipitate. Said precipitate is separated from the heterogeneous polymerization mixture and dehydrated by way of drying in vacuum at a temperature within the range of from 40° to 100° C.

4 Claims, No Drawings

METHOD OF PRODUCING LINEAR POLYETHYLENIMINE

The present invention relates to methods of producing linear polyethylenimine isomer (PEI). PEI is a versatile additive (adhesive, chelate-forming agent, ion-exchange and cationic flocculant) promoting various technological processes and improving quality of the production made such as paper and cardboard, rubber and textile articles.

Known in the art is a method of producing linear PEI (LPEI) by way of an isomerization polymerization of a five-membered nitrogen-containing heterocyclic compound such as oxazoline-2 in aprotic solvents or in mass in the presence of cationic catalysts such as organic or mineral acids, methyl iodide, boron trifluoride etherate or antimony pentafluoride etherate to obtain as a result, linear poly(N-acylethylenimines) which are further subjected to hydrolysis to give LPEI.

This prior art method has a disadvantage residing in the necessity of preliminary preparing the starting oxazoline 2 which is prepared from monoethanolamine in three stages with a yield of about 40%. Another disadvantage of this prior art method resides in the necessity of a special purification of the starting monomer, i.e. oxazoline-2 (re-distillation, crystallization, dehydration by means of molecular sieves). Moreover, it should be noted that even with a high-purity oxazoline and a fresh catalyst, i.e. boron trifluoride etherate prepared directly before the experiment the polymerization of oxazoline-2 in a solution of dimethylformamide or acetonitrile proceeds with a 70% yield (as calculated for the monomer) and results in the production of a relatively low-molecular poly (N-formylethylenimine). To convert the latter into LPEI, the reaction of alkaline hydrolysis is employed which results in a 85% yield and, of course, features common disadvantages of macromolecular reactions, viz. low rate and incomplete conversion of functional groups in the polymer. Therefore, said prior art method is rather time-consuming (consists of 5 stages) and results in the production of a low-molecular LPEI (mol. weight of about 2,800) with irregular structure (due to incomplete hydrolysis) and yield of about 24% as calculated in the monoethanolamine entered in the reaction.

It is an object of the present invention to provide a method of producing linear polyethylenimine which would be simplified in respect of the processing.

It is another object of the present invention to provide a process which would enable the production of the desired product with a higher molecular weight and more uniform composition.

These and other objects are accomplished by that, in accordance with the preset invention, the mass polymerization of ethylenimine or its oligomers, i.e. dimer, trimer or linear tetramer taken individually or in a mixture is effected at a temperature within the range of from 40° to 55° C in the presence of cationic catalysts such as mineral acids (hydrochloric, sulphuric or chloric acid, ammonium salts of hydrochloric, sulphuric or chloric acid, dichloropropane or dichloropropanol taken in an amount of from 0.1 to 1.0 mol.% per each elementary unit; said mass polymerization is conducted until a conversion ratio of ethylene imine cycles of 10 to 25% is reached; then the resulting polymerization mixture is cooled to a temperature ranging from 5° to 25° C and added with water at a weight ratio of from 1:2.5 to 2.5:1 and the mixture is maintained at a temperature within the range of from 5 to 25° C until the polymerization is completed to give a heterogeneous polymerization mixture containing linear polyethylenimine crystallohydrate in the form of a precipitate which is then separated from the heterogeneous polymerization mixture and dehydrated by drying in vacuum at a temperature within the range of from 40° to 100° C.

Ethylenimine employed in this method as the starting product is a commercially available technical monomer. The polymerization of ethylenimine or oligomers thereof to LPEI is simple as to its technological scheme and appareillage and may be performed using conventional plants for the production of branched PEI (BPEI).

Corresponding intentional change of conditions of the polymerization process (the use of water and low temperatures within the range of from 5 to 25° C) makes it possible to eliminate, at the polymerization stage, blocking of imine groups of the propagating polymeric chains by covalent-bonded protective (acyl) groups which is characteristic for the prior art method and to replace said groups with water molecules bonded to imino groups by means of hydrogen bonds. During dehydration of LPEI this water is completely removed from the polymer to give, as a result, the desired product with a uniform composition.

The nature and amount of the catalysts employed in the method of the present invention make it possible to control the molecular weight of the resulting polymer within a wide range (from 1,000 to 40,000).

The method of the present invention makes it possible to produce LPEI with a maximum yield of about 55% as calculated on the starting heterocyclic compound consumed in the reaction. The remaining portion of the starting product is not wasted at all; instead, it is converted into a water-soluble BPEI which is of a commercial interest and which may be easily separated from water-insoluble LPEI.

To accelerate the polymerization process, it is advisable to add, into the polymerization mixture cooled to 5° – 25° C, along with water, a cationic catalyst - hydrochloric, sulphuric or chloric acid or ammonium salt of hydrochloric or chloric acid in an amount ranging from 1 to 5 mol.% per each elementary unit.

To increase the desired product yield, it is advisable, prior to cooling the reaction mixture to a temperature of from 5° to 25° C, to desactivate the cationic catalyst with an alkali, to distill-off the starting monomer or oligomer from the reaction mixture and to add, thereafter, to the polymerization mixture cooled to 5°–25° C, along with water, a cationic catalyst - hydrochloric, sulphuric or chloric acid or ammonium salt thereof in an amount of from 1 to 5 mol.% per each unit.

To the same end, it is advisable in order to distill-off, along with the starting monomer, the dimer resulting from the mass polymerization.

The method of producing LPEI in accordance with the present invention may be performed in the manner as follows.

Into a flask provided with a stirrer ethylenimine or its oligomers, i.e. dimer, trimer or liner tetramer taken individually or in a mixture, are charged. The flask is heated on a water bath to 40° C and a cationic catalyst such as hydrochloric, sulphuric or chloric acid, ammonium chloride, ammonium sulphate or perchlorate, 1,3-dichloropropan-2-ol dichloropropane is gradually added through the reflux condenser. Therewith, the flask contents is heated, due to the polymerization heat, to 55° C (ethylene imine boils at this temperature). After addition of the catalyst the flask contents is stirred for additional 0.5 to 10 hours, the temperature being maintained within the range of from 40° to 55° C. The mass polymerization (first stage of the polymerization process) is discontinued when the conversion ratio of ethylenimine cycles in the resulting polymerization mixture is 10 to 25% which is determined by a refraction index value of the mixture (see Examples hereinbelow). The first polymerization stage is directed to accumulation of oligomeric products necessary to perform the second polymerization stage (i.e. polymerization contemplating the use of water).

The starting monomer or oligomer, upon completion of the first polymerization stage, may be distilled-off from the resulting polymerization mixture and employed in a new polymerization cycle. In this case, the cationic catalyst introduced at the first polymerization stage, prior to the distilling off of the starting monomer or oligomer, should be inactivated by way of adding an alkali (such as caustic soda or caustic potash) taken preferably in excess with respect to the catalyst amount used in the first polymerization stage.

To perform the second polymerization stage, the resulting polymerization mixture (with or without distilling-off the starting monomer or oligomer) is cooled to a temperature within the range of from 5° to 25° C, added with water at a weight ratio therebetween ranging from 1:2.5 to 2.5:1, whereafter the polymerization process is conducted at a temperature of from 5° to 25° C. If after the first polymerization stage the starting monomer or oligomer has been distilled-off and the catalyst has been inactivated, the polymerization mixture is added with a new portion of the cationic catalyst — hydrochloric acid, sulphuric or chloric acid or ammonium salt of hydrochloric acid or chloric acid in an amount ranging from 1 to 5 mol.% per each elementary unit. Said additional amount of the catalyst may be introduced into the polymerization mixture directly before or after the addition of water to the mixture of simultaneously with water. As the second polymerization stage progresses, the polymerization mixture homogeneous at the start of the process becomes stratified into BPEI or its aqueous solution and LPEI crystallohydrate precipitate (i.e., heterogeneous polymerization mixture is formed). Duration of the second polymerization stage and the desired product yield depend on the amounts of water and catalyst employed at this stage. Thus, an increased amount of the catalyst results in a higher polymerization rate with, however, decreased yield of the desired product. When water content in the polymerization mixture is increased, both said parameters (LPEI yield and polymerization rate) reach their maximal values at a weight ratio between water and the polymerization mixture ranging from 1:2.5 to 2.5:1.

The end of the polymerization is determined by the absence of a colour reaction of ethylenimine cycles with thiourea and sodium nitroprusside (the procedure is described in Example 1 hereinbelow). On completion of the polymerization process, the resulting heterogeneous polymerization mixture is separated, by decantation, into BPEI or its aqueous solution and LPEI crystallohydrate precipitate. Said precipitate is 3–4 times washed with water, the precipitate being separated from the last portion of the washings by centrifugation or filtration. Removal of the hydrate water from LPEI crystallohydrate is effected by drying in vacuum (e.g at a residual pressure of from 2 to 25 mm Hg) at a temperature within the range of from 40° to 100° C.

For better understanding of the present invention the following Examples illustrating the production of linear polyethylenimine are given hereinbelow.

EXAMPLE 1

250 ml of ethylenimine (207 g) were charged into a flask provided with a reflux condenser, stirrer, thermometer and water bath, heated to 40° C and dropwise added, via the reflux condenser, with 2.5 ml (0.5 mol.% of a concentrated hydrochloric acid (specific gravity of 1.19) for 30 minutes under stirring. After the catalyst addition, the flask content was stirred for additional 4 hours while maintaining the flask temperature at 40° C. The mass polymerization (the first polymerization stage) was discontinued when the conversion ratio of ethylenimine cycles in the resulting polymerization mixture reached 25% (refraction index of said polymerization mixture $n_D^{25} = 1.4410$).

To effect the second polymerization stage, the resulting polymerization mixture was cooled to 20° C, added with 200 ml of water (at a weight ratio therebetween of about 1:1) and 13 g (5 mol.%) of ammonium chloride (the latter was added portion-wise by 2–3 g portions so as the polymerization mixture temperature be maintained at 20° not more) and the mixture was maintained at 20° C until completion of the polymerization process. The end of the polymerization was determined by the absence of a colour reaction of ethylenimine cycles. To this end, a small portion of the polymerization mixture (2–3 drops) were mixed with 1 ml of a 10% thiourea solution in a 5N aqueous solution of hydrochloric acid, maintained for 15–20 minutes; the acid was then neutralized with a % aqueous solution of caustic soda and added with 1–2 drops of a 0.5% aqueous solution of sodium nitroprusside. Lack of crimson colour upon the addition of nitroprusside shows that ethylenimine cycles content in the polymerization mixture is below 0.01%.

As a result, a heterogeneous polymerization mixture was obtained which was separated, by decantation, into an aqueous BPEI solution and LPEI crystallohydrate precipitate. The latter was washed with water, centrifuged and dehydrated in a vacuum-drying cabinet (residual pressure 3–5 mm Hg) at 60° C for 20 hours to give 24 g of LPEI (12% of the theoretical yield) with the intrinsic viscosity in a solution of absolute ethanol of $[\eta]_{ethanol}^{20} = 0.1$ dl/g at 20° C and molecular weight of 4,500. NMR spectrum of this sample on nuclei $^{13}C$ consisted of one signal only which evidenced that the polymer had a uniform structure.

Dehydration of the BPEI aqueous solution and water washings resulted in 180 g of BPEI with the intrinsic viscosity $[\eta]_{NaCl}^{25} = 0.07$ dl/g at 25° C in a 0.1N aqueous solution of sodium chloride.

EXAMPLE 2

Mass polymerization of 500 ml of ethylenimine was performed in accordance with the procedure described in the foregoing Example 1 in the presence of 1.5 g (0.1 mol.%) of 1,3-di-chloropropane-2-ol till a 10% conversion ration of ethylenimine cycles in the resulting polymerization mixture was reached ($n_D^{25}$ of the mixture is 1.4250). Thereafter, the polymerization mixture was cooled to 25° C, added with 166 ml of water (at the weight ratio between water and the polymerization mixture of 1:2.5) and polymerized at 20° until completion of the process which was determined in a manner similar to that described in Example 1 hereinbefore.

As a result, a heterogeneous polymerization mixture was obtained which was added with 250 ml of water to reduce BPEI viscosity, whereafter said mixture was separated by decantation into an aqueous BPEI solution and LPEI crystalhydrate precipitate. The latter was washed with water, centrifuged and dehydrated in a vacuum-drying cabinet (at a residual pressure of 1–2 mm Hg) at the temperature of 40° C to give 37.5 g of LPEI (9% of the theoretical yield) with the intrinsic viscosity $[\eta]_{ethanol}^{20} = 0.31$ dlG and molecular weight of 23,500.

EXAMPLE 3

300 ml of ethylenimine dimer were polymerized in mass at 50° C in the presence of 12 ml (0.5 mol.%) of a 40% aqueous solution of chloric acid for 5 hours to give a polymerization mixture with a conversion ratio of ethylenimine cycles of about 20% ($n_D^{25}$ of the mixture was 1.4670). Said polymerization mixture was added with 20 g of solid caustic soda to inactivate the catalyst and the unreacted starting dimer was distilled-off in vacuum (156 g). Thereafter, the polymerization mixture (120 g) was separated from the alkali by decantation, cooled to 20° and the thus-cooled mixture was added with 300 ml of water (at the weight ratio between the polymerization mixture and water of 1:2.5) and 3.5 g of ammonium perchlorate (1.0 mol.%) and the polymerization was continued at 20° C till completion of the process. The resulting heterogeneous mixture was treated in a manner similar to that described in the foregoing Example 1 to give 60 g of LPEI (the yield was 50% as calculated on the converted dimer) with the intrinsic viscosity $[\eta]_{ethanol}^{20} = 0.16$ dl/g and 60 g of BPEI with the intrinsic viscosity $[\eta]_{NaCl}^{20} = 0.15$ dl/g.

EXAMPLE 4

500 ml of ethylenimine were polymerized in mass at the temperature of 55° C in the presence of 4.4 ml (0.5 mol.%) of a concentrated hydrochloric acid to obtain a polymerization mixture with the conversion ratio of ethylenimine cycles of 20% ($n_D^{25}$ of the mixture was 1.4380). Said polymerization mixture was added with 20 g of solid caustic potash to inactivate the catalyst and the starting unreacted monomer was distilled-off, followed by distilling-off ethylenimine dimer resulting from the polymerization process (the dimer yield was 100 g or 25% of the theoretical value). Thereafter, the polymerization mixture (150 g) was separated from the alkali by decantation, cooled to 25° C and added with 360 ml of water (at the weight ratio between water and the polymerization mixture of 2.4:1) and 6 g of ammonium perchlorate (1.5 mol.%) and the polymerization was continued until completion of the process. The resulting heterogeneous polymerization mixture was treated in a manner similar to that described in the foregoing Example 1 to give 18 g of LPEI (yield of 12% as calculated on the converted ethylenimine) having its intrinsic viscosity value $[\eta]_{ethanol}^{20} = 0.18$ dl/g.

EXAMPLE 5

800 ml of ethylenimine were polymerized in mass at the temperature of 40° C in the presence of 10 g of a 50% aqueous solution of sulphuric acid to obtain a polymerization mixture with the conversion ratio of ethylenimine cycles of 10% ($n_D^{25}$ of the mixture was 1.4250). Said polymerization mixture was added with 20 g of a solid alkali to inactivate the catalyst and the starting unreacted monomer was distilled-off. Thereafter, the polymerization mixture (180 g) was separated from the alkali by decantation, cooled to the temperature of 5° C and added with 450 ml of water (at the weight ratio between water and the polymerization mixture of 2.5:1) and 10 ml (1 mol.%) of a 40% aqueous solution of chloric acid and the polymerization was continued at this temperature until completion of the process.

As a result, a heterogeneous polymerization mixture was obtained which was separated by decantation into an aqueous BPEI solution and LPEI crystalhydrate precipitate. The latter was washed with water, centrifuged and dehydrated in a vacuum-drying cabinet (under a residual pressure of 20 mm Hg) at the temperature of 100° C to give 40 g of LPEI (the yield was 22% of the converted ethylenimine) with the intrinsic viscosity $[\eta]_{ethanol}^{20} = 0.21$ dl/g and 140 g of BPEI with the intrinsic viscosity $[\eta]_{NaCl}^{25} = 0.1$ dl/g.

EXAMPLE 6

100 of ethylenimine trimer were polymerized in mass at the temperature of 40° C in the presence of 0.85 ml (0.5 mol.%) of a concentrated hydrochloric acid (specific gravity of 1.19) for 2 hours to obtain a polymerization mixture with a conversion ratio of ethylenimine cycles of about 10% ($n_D^{25}$ of the mixture was 1.4815). Thereafter, the polymerization mixture was cooled to 20° C, added with 150 ml of water (at the weight ratio between water and the polymerization mixture of 1.6:1) and 2.5 g (1 mol.%) of ammonium perchlorate, and the polymerization was continued at this temperature until completion of the process. The resulting heterogeneous polymerization mixture was treated in a manner similar to that described in the foregoing Example 1 to give 33 g of LPEI (the yield was 35% of the theoretical value) with the intrinsic viscosity $[\eta]_{ethanol}^{20} = 0.19$ dl/g and 60 g of BPEI with the intrinsic viscosity of $[\eta]_{NaCl}^{25} = 0.15$ dl/g.

EXAMPLE 7

Linear ethylenimine tetramer (50 ml) was polymerized in mass at the temperature of 40° C in the presence of 1.2 g (1.0 mol.%) of ammonium perchlorate for a period of one hour to obtain a polymerization mixture with the conversion ratio of ethyenimine cycles of about 10%. ($n_D^{25}$ of the mixture was 1.4930). Thereafter, the polymerization mixture was cooled to the temperature of 20° C, mixed with 100 ml of water (at the weight ratio between water and the polymerization mixture of 2:1) and maintained at this temperature until completion of the polymerization process. The resulting heterogeneous polymerization mixture was treated in a manner similar to that described in the foregoing Example 1 to give 26 g of LPEI (the yield was 55% of the theoretical value with the intrinsic viscosity $[\eta]_{ethanol}^{20} = 0.15$ dl/g and 22 g of BPEI with the intrinsic viscosity $[\eta]_{NaCl}^{25} = 0.13$ dl/g.

EXAMPLE 8

A mixture of dimer, trimer and linear tetramer of ethylenimine (weight proportions of the oligomers being 1:1:1) in the amount of 100 g was polymerized in mass at the temperature of 40° C in the presence of 1 g (1 mol.%) of ammonium chloride for a period of two hours to obtain a polymerization mixture with the conversion ratio of ethylenimine cycles of 10% ($n_D^{25}$ of the mixture was 1.4820). Thereafter, the polymerization mixture was cooled to 25° C, added with 200 ml of water (at the weight ratio between water and the polymerization mixture of 2:1) and the polymerization was continued at this temperature until completion of the process. The resulting heterogeneous polymerization mixture was treated in a manner similar to that described in the foregoing Example 1 to give 40 g of LPEI (the yield is 40% of the theoretical value) with the intrinsic viscosity $[\eta]_{ethanol}^{20} = 0.16$ dl/g and 60 g of BPEI with the intrinsic viscosity $[\eta]_{NaCl}^{25} = 0.13$ dl/g.

EXAMPLE 9

500 ml of ethylene imine were polymerized in mass at the temperature of 40° C in the presence of 1.4 g (0.125 mol.% of 1,3-dichloropropane for a period of about 4 hours to obtain a polymerization mixture with the conversion ratio of ethylenimine cycles of 10% ($n_D^{25}$ of the mixture was 1.4250). Thereafter, the polymerization mixture was cooled to 20° C, added with 177 ml of water (at the weight ratio between water and the polymerization mixture of 1:2.3) and maintained at this temperature until completion of the process. The resulting heterogeneous polymerization mixture was treated in a manner similar to that described in Example 1 to give 30 g LPEI (the yield was 7.5% of the theoretical value) with the intrinsic viscosity $[\eta]_{ethanol}^{20} = 0.42$ dl/g.

What is claimed is:

1. A method of producing linear polyethylenimine, comprising polymerization of nitrogen-containing heterocyclic compounds selected from the group consisting of ethylenimine and oligomers thereof, viz. dimer, trimer and linear tetramer, at a temperature within the range of from 40 to 55° C in the presence of cationic catalysts selected from the group consisting of hydrochloric acid, sulphuric and chloric acid, ammonium salts of hydrochloric acid and chloric acid, dichloropropane and dichloropropanol and taken in an amount ranging from 0.1 to 1.0 mol.% per each elementary unit; said polymerization in mass being conducted until a conversion ratio of ethylenimine cycles of 10 to 25% is reached; thereafter, the resulting polymerization mixture is cooled to a temperature within the range of from 5 to 25° C, added with water at a weight ratio between water and the polymerization mixture ranging from 1:2.5 to 2.5:1 and maintained at a temperature within the range of from 5° to 25° until completion of the polymerization process to obtain a heterogeneous polymerization mixture containing linear polyethlenimine crystallohydrate as a precipitate; said precipitate is separated from the heterogeneous polymerization mixture and dehydrated by drying in vacuum at a temperature within the range of from 40° to 100° C.

2. A method as claimed in claim 1, wherein the polymerization mixture cooled to a temperature of from 5 to 25° C is added, along with water, with a cationic catalyst selected from the groups consisting of hydrochloric acid, sulphuric and chloric acid and ammonium salts of hydrochloric and chloric acids and taken in an amount ranging from 1 to 5 mol.% per each elementary unit.

3. A method as claimed in claim 1, wherein, prior to cooling the polymerization mixture to a temperature within the range of from 5° to 25° C, the cationic catalyst is inactivated with an alkali, the starting nitrogen-containing heterocyclic compounds are removed from the polymerization mixture by distilling-off, whereupon the mixture is cooled to a temperature of from 5° to 25° C and added, along with water, with a cationic catalyst selected from the group consisting of hydrochloric acid, sulphuric and chloric acid and ammonium salts of hydrochloric and chloric acids and taken in an amount ranging from 1 to 5 mol.% per each elementary unit.

4. A method as claimed in claim 3, wherein, along with the starting ethylenimine, distilled-off from the polymerization mixture is also ethylenimine dimer resulting from the mass polymerization.

* * * * *